(12) United States Patent
Osei-Bonsu

(10) Patent No.: US 9,917,902 B2
(45) Date of Patent: Mar. 13, 2018

(54) SYSTEM AND METHOD FOR SCALABLE AND EFFICIENT DEPLOYMENT OF WIRELESS INFRASTRUCTURE NODES FOR MULTIPLE COLLOCATED WIRELESS FIELD DEVICE NETWORKS

(71) Applicant: Honeywell International Inc., Morristown, NJ (US)

(72) Inventor: William Osei-Bonsu, Collegeville, PA (US)

(73) Assignee: Honeywell International Inc., Morris Plains, NJ (US)

( * ) Notice: Subject to any disclaimer, the term of this patent is extended or adjusted under 35 U.S.C. 154(b) by 219 days.

(21) Appl. No.: 14/848,956

(22) Filed: Sep. 9, 2015

(65) Prior Publication Data

US 2017/0070578 A1 Mar. 9, 2017

(51) Int. Cl.
| | |
|---|---|
| *H04L 29/08* | (2006.01) |
| *H04L 12/741* | (2013.01) |
| *H04W 56/00* | (2009.01) |
| *H04L 12/927* | (2013.01) |
| *H04W 84/18* | (2009.01) |

(52) U.S. Cl.
CPC ............ *H04L 67/125* (2013.01); *H04L 45/74* (2013.01); *H04L 47/805* (2013.01); *H04W 56/001* (2013.01); *H04W 84/18* (2013.01)

(58) Field of Classification Search
CPC ..... H04L 67/125; H04L 45/74; H04L 47/805; H04L 45/04; H04W 56/001; H04W 84/18; H04W 84/12
USPC ......................................... 370/310, 345, 349
See application file for complete search history.

(56) References Cited

U.S. PATENT DOCUMENTS

| | | |
|---|---|---|
| 7,327,171 B2 | 2/2008 | Borowski et al. |
| 7,474,642 B1 | 1/2009 | Chheda |
| 7,965,664 B2 | 6/2011 | Hodson et al. |
| 7,969,300 B2 | 6/2011 | Coronel et al. |
| 8,583,067 B2 | 11/2013 | Budampati et al. |
| 9,021,255 B1 | 4/2015 | Aharoni |

(Continued)

FOREIGN PATENT DOCUMENTS

KR  10-1290963 B1  7/2013

OTHER PUBLICATIONS

Notification of Transmittal of the International Search Report and the Written Opinion of the International Searching Authority, or the Declaration dated Dec. 9, 2016 in connection with International Patent Application No. PCT/US2016/049917.

*Primary Examiner* — Obaidul Huq

(57) ABSTRACT

A wireless infrastructure node includes at least one processing device configured to receive a data packet from a wireless field device network (WFN) controller, where the data packet includes a network identifier. The at least one processing device is also configured to determine a field device network to receive the data packet based on the network identifier. The at least one processing device is further configured to transmit the data packet to a field device in the field device network. The wireless infrastructure node, the WFN controller, and the field device network comprise one logical WFN among a plurality of logical WFNs. The wireless infrastructure node is one of a plurality of pooled infrastructure nodes configured to communicate between a plurality of WFN controllers and a plurality of field device networks arranged in the plurality of logical WFNs.

20 Claims, 6 Drawing Sheets

(56) References Cited

U.S. PATENT DOCUMENTS

| | | |
|---|---|---|
| 2005/0174964 A1 | 8/2005 | Orlik et al. |
| 2008/0040509 A1* | 2/2008 | Werb .................... H04W 84/18 709/242 |
| 2009/0010233 A1* | 1/2009 | Pratt, Jr. ................ G01D 21/00 370/338 |
| 2009/0316628 A1 | 12/2009 | Enns et al. |
| 2011/0216656 A1 | 9/2011 | Pratt, Jr. et al. |
| 2011/0245932 A1 | 10/2011 | Schleiss et al. |
| 2011/0276607 A1 | 11/2011 | Surna |
| 2012/0236768 A1 | 9/2012 | Kolavennau et al. |
| 2013/0095847 A1 | 4/2013 | Powell |
| 2014/0355581 A1 | 12/2014 | Pulini et al. |
| 2015/0009833 A1 | 1/2015 | Pavlovski et al. |

* cited by examiner

SYSTEM AND METHOD FOR SCALABLE AND EFFICIENT DEPLOYMENT OF WIRELESS INFRASTRUCTURE NODES FOR MULTIPLE COLLOCATED WIRELESS FIELD DEVICE NETWORKS

TECHNICAL FIELD

This disclosure relates generally to industrial process control and automation systems. More specifically, this disclosure relates to a system and method for scalable and efficient deployment of wireless infrastructure nodes for multiple collocated wireless field device networks.

BACKGROUND

Industrial process control and automation systems (sometimes referred to simply as "control systems") are often used to automate large and complex industrial processes. These types of systems routinely include sensors, actuators, and controllers. Some types of controllers typically receive measurements from the sensors and generate control signals for the actuators.

Some field instruments and field devices (collectively referred to as "field devices") include sensor nodes used to obtain measurements of particular characteristics in an industrial process. Other field devices include actuator nodes used to adjust operations in the industrial process. A field device exchanges information with the control system over a wired or wireless interface.

As wireless technology has continued to become more available, wireless field devices have become more commonly used in control systems. A wireless field device includes transceiver circuitry that is capable of wirelessly transmitting and receiving information. Some wireless networks can include a large number of wireless field devices. For example, a wireless network may be used to transport sensor information from numerous wireless field devices to a controller of the control system.

SUMMARY

This disclosure provides a system and method for scalable and efficient deployment of wireless infrastructure nodes for multiple collocated wireless field device networks.

In a first embodiment, a wireless infrastructure node includes at least one processing device configured to receive a data packet from a wireless field device network (WFN) controller, where the data packet includes a network identifier. The at least one processing device is also configured to determine a field device network to receive the data packet based on the network identifier. The at least one processing to device is further configured to transmit the data packet to a field device in the field device network. The wireless infrastructure node, the WFN controller, and the field device network comprise one logical WFN among a plurality of logical WFNs. The wireless infrastructure node is one of a plurality of pooled infrastructure nodes configured to communicate between a plurality of WFN controllers and a plurality of field device networks arranged in the plurality of logical WFNs.

In a second embodiment, a method includes receiving, at a wireless infrastructure node, a data packet from a WFN controller, where the data packet includes a network identifier. The method also includes determining, at the wireless infrastructure node, a field device network to receive the data packet based on the network identifier. The method further includes transmitting, by the wireless infrastructure node, the data packet to a field device in the field device network. The wireless infrastructure node, the WFN controller, and the field device network comprise one logical WFN among a plurality of logical WFNs. The wireless infrastructure node is one of a plurality of pooled infrastructure nodes configured to communicate between a plurality of WFN controllers and a plurality of field device networks arranged in the plurality of logical WFNs.

In a third embodiment, a system includes a plurality of WFN controllers and a plurality of field device networks, where each field device network includes one or more field devices. The system also includes a plurality of wireless infrastructure nodes arranged in a shared pool. The pooled infrastructure nodes are configured to communicate between the plurality of WFN controllers and the plurality of field device networks. Each wireless infrastructure node is configured to receive a data packet from a first one of the WFN controllers, where the data packet includes a network identifier. Each wireless infrastructure node is also configured to determine a first one of the field device networks to receive the data packet based on the network identifier and transmit the data packet to a field device in the first field device network. The WFN controllers, the field device networks, and the wireless infrastructure nodes are arranged in a plurality of logical WFNs, where each logical WFN includes a WFN controller, a field device network, and the pooled infrastructure nodes.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
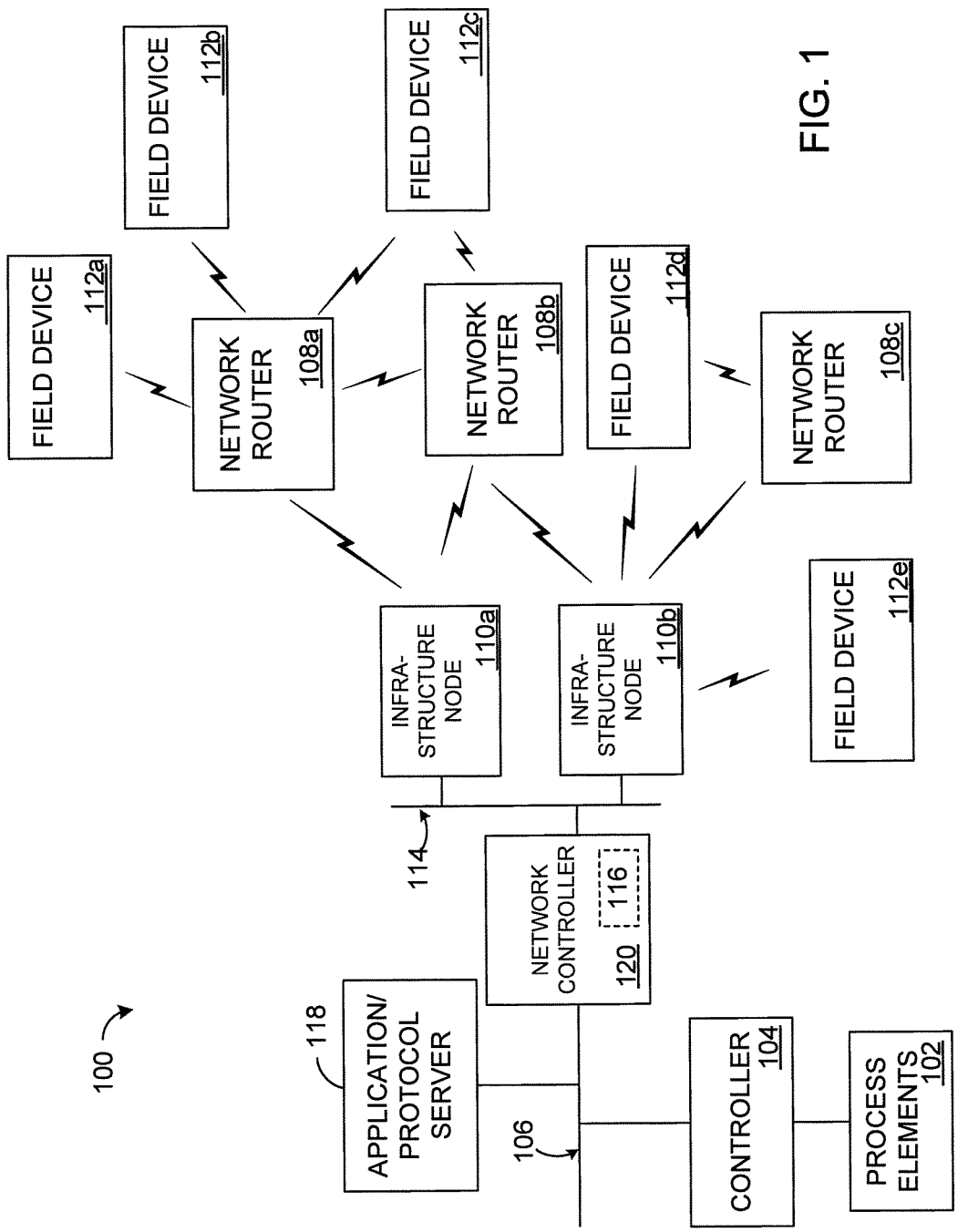
FIG. 1 illustrates an example industrial process control and automation system according to this disclosure.

FIG. 1 illustrates an example industrial control and automation system 100 according to this disclosure. As shown in FIG. 1, the system 100 includes one or more process elements 102. The process elements 102 represent components in a process or production system that may perform any of a wide variety of functions. For example, the process elements 102 could represent sensors, actuators, or any other or additional industrial equipment in a processing environment. Each of the process elements 102 includes any suitable structure for performing one or more functions in a processing or production system. Also, the phrase "industrial control and automation system" generally refers to a system that automates and controls at least one process.

A controller 104 is coupled to the process elements 102. The controller 104 controls the operation of one or more of the process elements 102. For example, the controller 104 could receive information associated with the system 100, such as by receiving sensor measurements from some of the process elements 102. The controller 104 could use this information to provide control signals to others of the process elements 102, thereby adjusting the operation of those process elements 102. The controller 104 includes any suitable structure for controlling one or more process elements 102. The controller 104 could, for example, represent a computing device executing an embedded LINUX or other operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations. As a particular example, the network 106 could include a FAULT TOLERANT ETHERNET network from HONEYWELL INTERNATIONAL INC.

The system 100 also includes one or more industrial wireless networks for communicating with wireless sensors, actuators, or other wireless field devices. In the example shown in FIG. 1, an industrial wireless network includes network routers 108a-108c and infrastructure nodes 110a-110b. The network routers 108a-108c and infrastructure nodes 110a-110b wirelessly communicate with each other to form a wireless network, such as a mesh network. For example, the network routers 108a-108c could receive data transmitted wirelessly from field devices 112a-112e and route the data to the infrastructure nodes 110a-110b. The infrastructure nodes 110a-110b could receive data from the network routers 108a-108c directly or indirectly (such as through other to field routers) and directly or indirectly from the field devices 112a-112e for transmission over a backbone network 114. The network routers 108a-108c and infrastructure nodes 110a-110b could also route data received over the backbone network 114 to the field devices 112a-112e. In this way, the network routers 108a-108c and infrastructure nodes 110a-110b form a wireless network that can provide wireless coverage to field devices and other devices in a specified area, such as a large industrial complex. The wireless network can support any suitable industrial wireless network protocol(s), such as ISA100.11a Wireless or WirelessHART.

In this example, the network routers 108a-108c and infrastructure nodes 110a-110b generally represent routing devices that store and forward messages for other devices. The network routers 108a-108c may be locally or battery powered. Infrastructure nodes 110a-110b may be line-powered, meaning these devices receive operating power from external sources (such as A/C supply lines). However, the network routers 108a-108c may be line-powered, or the infrastructure nodes 110a-110b may be locally powered such as by batteries (referred to as locally-powered). The field devices 112a-112e generally represent non-routing devices that are routinely locally-powered, although a field device could provide routing functionality or be line-powered.

Each network router 108a-108c and infrastructure node 110a-110b includes any suitable structure facilitating wireless communications, such as a radio frequency (RF) spread-spectrum or orthogonal frequency division multiplexing (OFDM) transceiver. Each of the infrastructure nodes 110a-110b also includes any suitable structure facilitating communication over the backbone network 114, such as an Ethernet transceiver. In particular embodiments, the network routers 108a-108c could represent field device access points (FDAPs) that are not connected via wired Ethernet and may be locally powered, and the infrastructure nodes 110a-110b could represent FDAPs that are connected via wired Ethernet and may be line powered. The backbone network 114 includes any suitable network for transporting data, such as a FAULT TOLERANT ETHERNET network, a wireless mesh network, or other wired or wireless network.

A gateway 116 couples the network 106 and the backbone network 114. The gateway 116 can perform security functions to allow only authorized traffic to flow between the networks 106 and 114. The gateway 116 can also perform translation functions to translate between protocols. The gateway 116 includes any suitable structure for providing access to networks and translating between protocols used by those networks. In some embodiments, the gateway may be part of a network controller 120, or the network controller 120 and the gateway 116 may represent separate components.

An application/protocol server 118 can configure and control various aspects of the system 100 via the network controller 120. For example, the server 118 can allow for the control of process elements 102 via the controller 104 and via the network controller 120, which configures the operation of the network routers 108a-108c, infrastructure nodes 110a-110b, and field devices 112a-112e. Another function of the network controller 120 can be to control and manage the networks 106, 114 by determining which and how wireless devices should connect to one another to form a resilient mesh or star network. The server 118 could also support security in the system 100, such as by allowing the network controller 120 to distribute cryptographic keys or other security data to various wireless devices or other components. The server 118 includes any suitable structure for operating industrial control and automation system 100.

In particular embodiments, various devices in the wireless network of FIG. 1 form a mesh network communicating at 2.4 GHz or 5.8 GHz. Also, in particular embodiments, data can be injected into the wireless mesh network through the routers or field devices, thus providing versatile, multifunctional, plant-wide coverage for wireless sensing, asset location tracking, personnel tracking, wireless communications, and any other or additional functionality as desired.

In one aspect of operation, one or more components in the system 100 support the use of a pool of shared wireless infrastructure nodes that are capable of communicating data packets for multiple logical wireless field device networks. This functionality is described in greater detail below.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. In addition, while described as supporting wired and wireless networks, the industrial control and automation system 100 could support any number of wireless networks with or without any wired networks.

Figure 2:
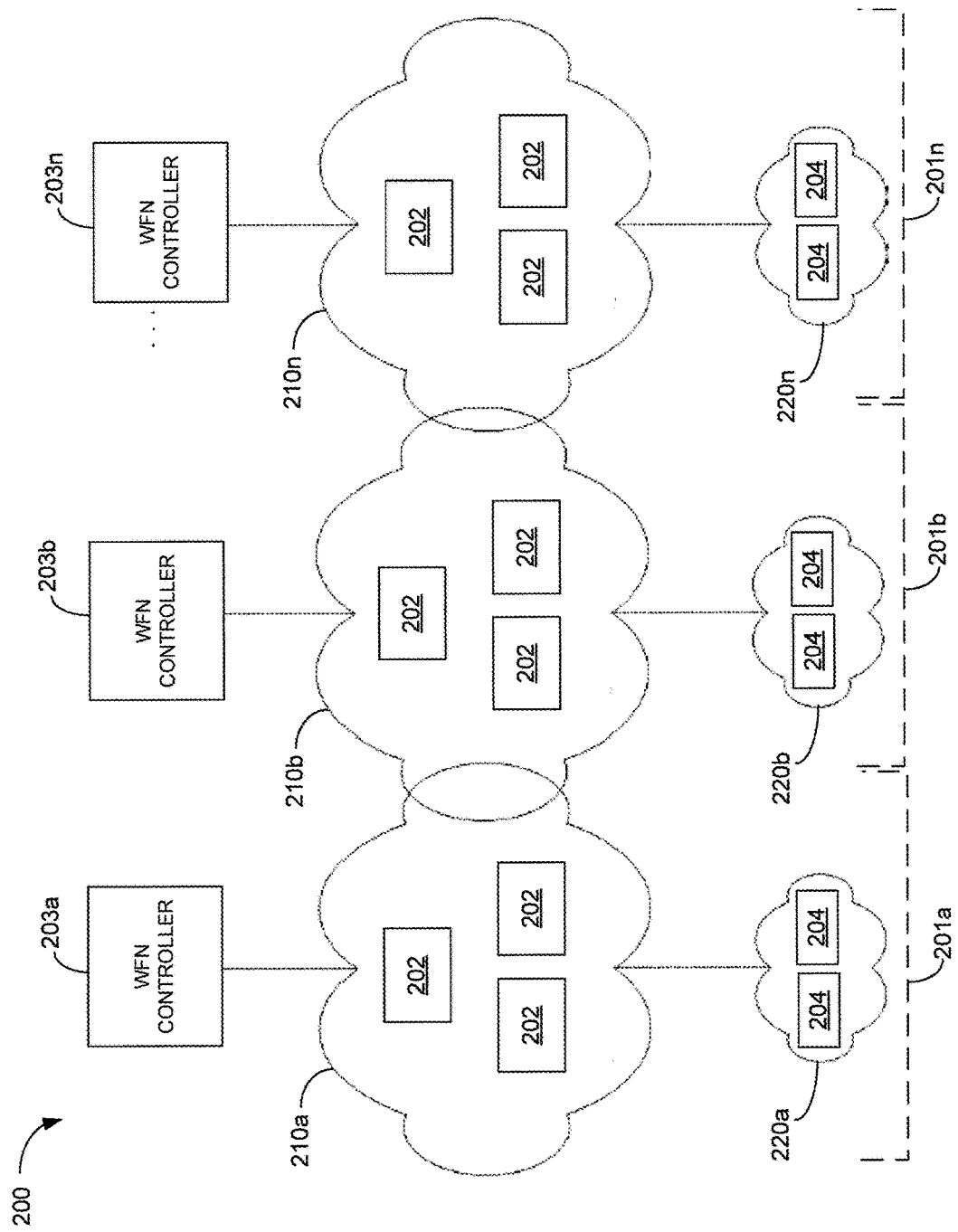
FIG. 2 illustrates an example system having a deployment of wireless field device networks (WFNs) according to this disclosure.

FIG. 2 illustrates an example system 200 having a deployment of wireless field device networks (WFNs) according to this disclosure. One or more of the components of the system 200 may represent (or be represented by) one or more of the components of the industrial control and automation system 100 shown in FIG. 1. Throughout this disclosure, the phrase "wireless field device network" encompasses a variety of wireless networks in industrial applications that include various types of field devices. One particular example of a wireless field device network is a wireless sensor network.

A typical wireless field device network deployment, such as in the system 200, involves upfront engineering effort and one or more site surveys with the goal of providing maximum coverage to a particular geographic area. This coverage is often provided with a single wireless mesh network using multiple infrastructure nodes such as FDAPs.

As shown in FIG. 2, the system 200 includes a plurality of WFNs 201a-201n deployed in a geographical area, such as an industrial plant. Each WFN 201a-201n includes one or more wireless infrastructure nodes 202, a WFN controller 203a-203n, and one or more field devices 204. Each WFN 201a-201n is under the control of the respective WFN controller 203a-203n. The one or more wireless infrastructure nodes 202 are arranged in infrastructure node mesh networks 210a-210n (or "INODE networks" for short). In some embodiments, one or more of the infrastructure nodes 202 may represent FDAPs.

In some embodiments, there is a one-to-one association between an INODE network 210a-210n and a WFN controller 203a-203n. Each WFN controller 203a-203n is in communication with one or more field devices 204, which may be arranged in a field device network 220a-220n. In a typical plant environment, each INODE network 210a-210n and its associated field devices 204 (or field device networks 220a-220n) are associated with a particular smaller geographical footprint within the larger geographical area, such that there may not be much (if any) geographical overlap between adjacent WFNs 201a-201n.

Each wireless infrastructure node 202 may be associated with one and only one WFN or subnet. Each wireless infrastructure node 202 has the capacity to support communications with a number of field devices 204, such as N devices. Thus, if there are M wireless infrastructure nodes 202 in an INODE network 210a-210n, the overall capacity of the INODE network 210a-210n can be M×N field devices. In addition, each WFN controller 203a-203n can have the capacity to control J≤M×N field devices 204.

The network capacity of each WFN 201a-201n is therefore typically limited by the WFN controller 203a-203n, which has a lower capacity than the INODE network 210a-210n. Once network capacity is reached, any excess capacity of the WFN (such as M×N−J devices) may go to waste. New infrastructure (such as additional WFNs and WFN controllers) may need to be deployed to increase overall system capacity, even if the additional field devices are within radio reach of existing wireless infrastructure with excess backbone capacity. This has a number of disadvantages—there is a financial cost to added deployment, and the radio spectrum becomes more crowded and may degrade overall system performance with additional deployment.

Most current deployment models only favor separation of WFNs accompanied by physical separation of the wireless infrastructure nodes. This can be difficult to achieve in practical large wireless system implementations. In theory, the system could be expanded just by adding a new WFN controller, but there are significant practical limitations to this due to the manner in which wireless access points are deployed (such as physical collocation). As a result, the plant site may not be able to grow beyond a single system capacity without added re-engineering costs of additional infrastructure and equipment.

Figure 3:
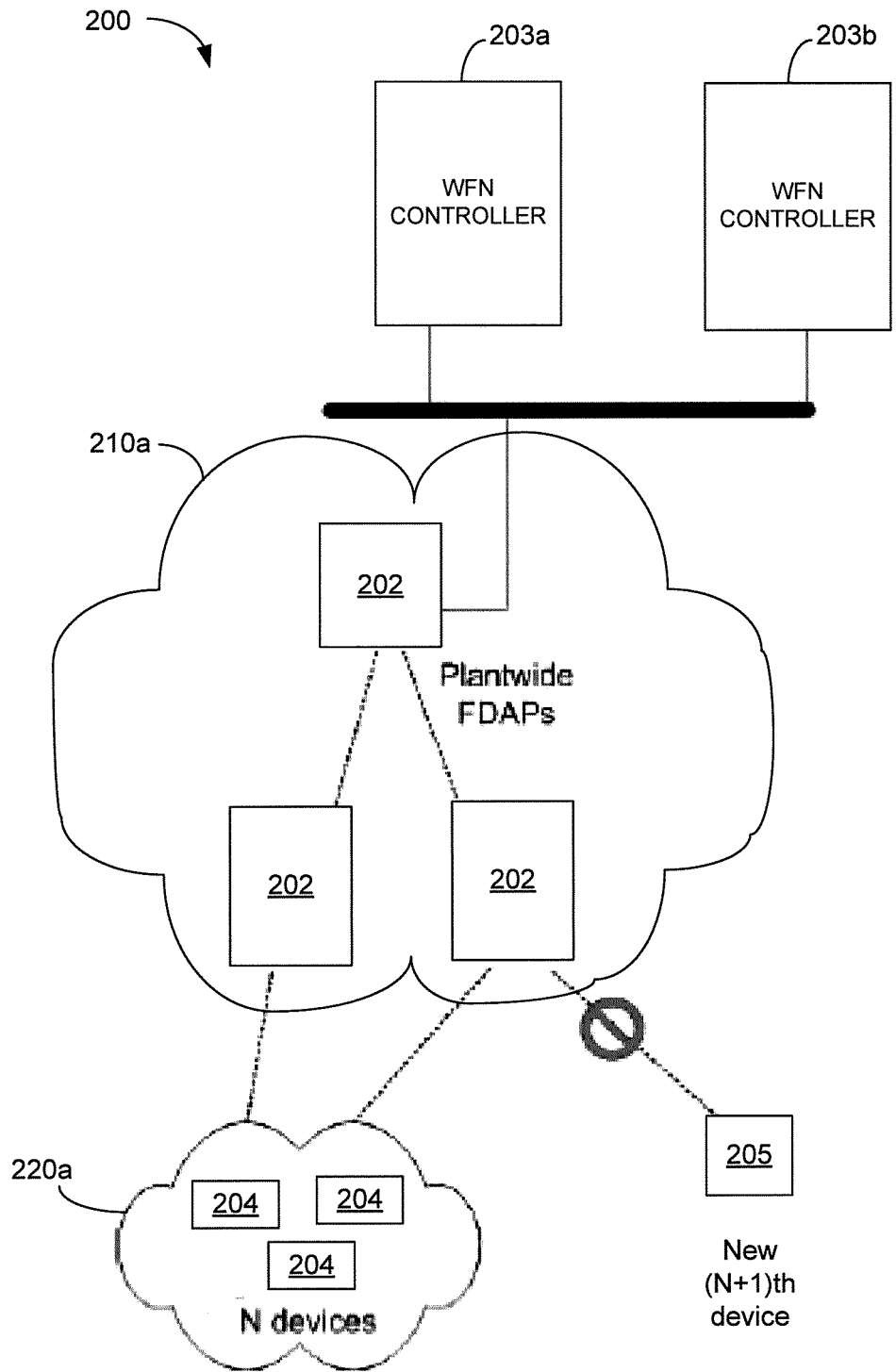
FIG. 3 illustrates an example use case highlighting some of the challenges of the system of FIG. 2 according to this disclosure.

FIG. 3 illustrates an example use case highlighting some of the challenges of the system 200 of FIG. 2 according to this disclosure. As described above, the system 200 is deployed with a plurality of wireless infrastructure nodes 202 in multiple NODE networks 210a-210n for plant-wide coverage.

The quantity and coverage of the wireless infrastructure nodes 202 in the system 200 is typically determined by taking into account any future needs for additional field devices 204. Each WFN 201a-201n can often only support a fixed number of field devices 204 using its associated WFN controller 203a-203n and INODE network 210a-210n of wireless infrastructure nodes 202. The capacity limitations are driven by (i) the capacity of each WFN controller 203a-203n and (ii) the overall capacity of the set of wireless infrastructure nodes 202 in the INODE network 210a-210n. These two capacity limits are largely independent of each other. This means it is possible to reach the capacity of a WFN controller 203a-203n without exhausting the collective capacity of the wireless infrastructure nodes 202.

In FIG. 3, a plurality of field devices 204 are coupled to the WFN controller 203a through the wireless infrastructure nodes 202 of the INODE network 210a. Over time, additional field devices 204 may be deployed in the system 200 as needed until the capacity limit of the WFN controller 203a is met. Once the capacity of the WFN controller 203a is reached, adding another wireless field device 205 may require deployment of a new INODE network of wireless infrastructure nodes 202 or an additional WFN controller 203b within the same geographical area. This new infrastructure adds engineering, deployment, and maintenance costs as well as possible radio interference to the previously deployed infrastructure units.

In an ideal case, a plant operator would like the ability to add a new field device 205 anywhere within the plant coverage area of the wireless infrastructure nodes 202 and control the new field device 205 with the WFN controller 203b. However, even though the WFN controller 203b provides increased capacity, the plant operator may not be able to simply add the new field device 205 without additional costs of survey, engineering, and installation of a new INODE network. This is indicated in FIG. 3 by the circle with the diagonal line through it.

In order to add the new field device 205 using one or more existing wireless infrastructure nodes 202, some existing wireless infrastructure nodes 202 may have to be redeployed or reprogrammed to join the new WFN controller 203b in order to provide a path back to the WFN controller 203b. This can create coverage holes for existing field devices 204 that had relied on the now-redeployed wireless infrastructure nodes 202 for good connectivity. Alternatively, depending on the geographic location of the new field device 205, another set of wireless infrastructure nodes 202 may be needed to provide end-to-end connectivity to the WFN controller 203b. This scenario effectively limits overall system capacity and results in unused or wasted excess capacity.

Figure 4:
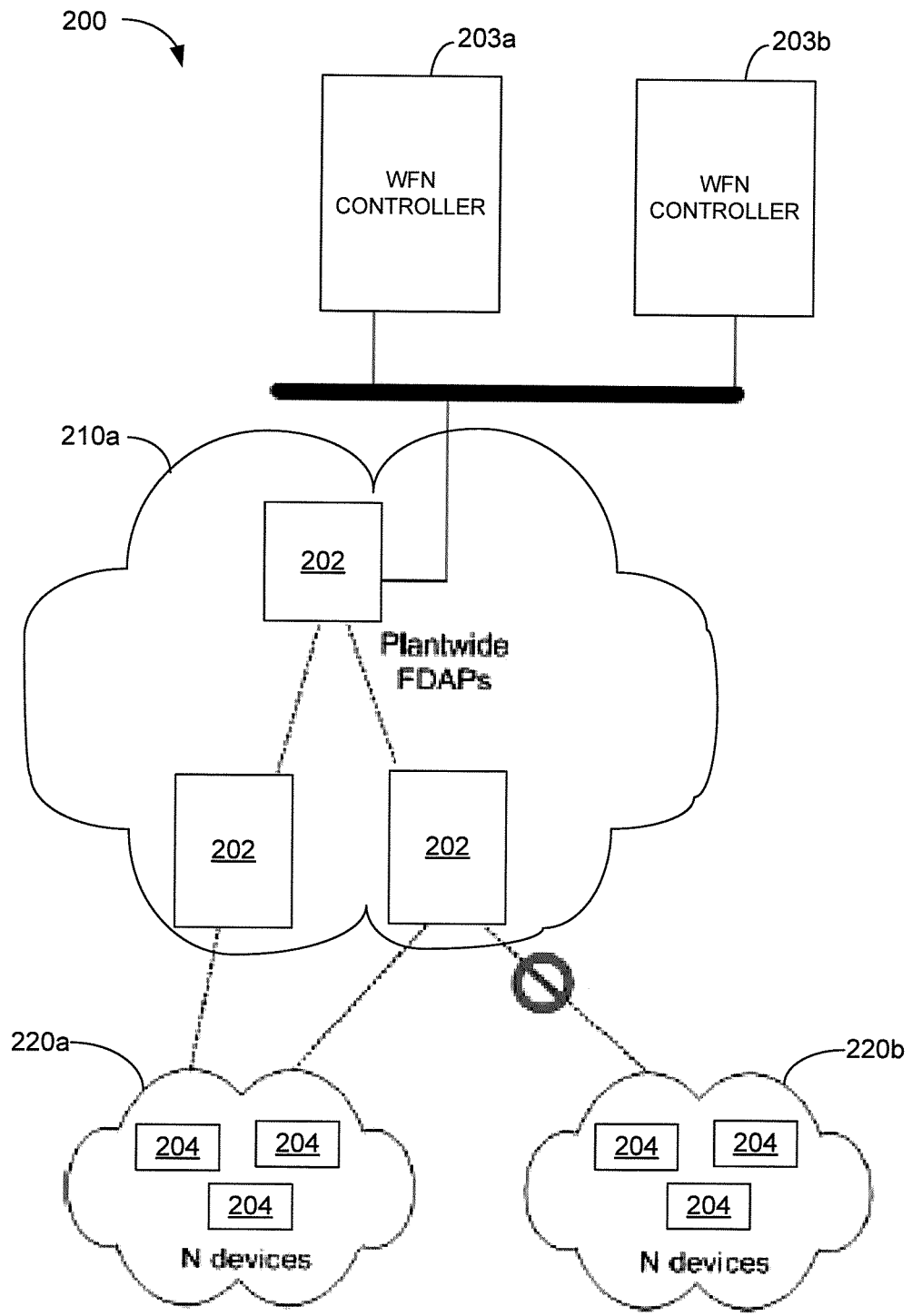
FIG. 4 illustrates another example use case highlighting some challenges of the system of FIG. 2 according to this disclosure.

FIG. 4 illustrates another example use case highlighting some challenges of the system 200 of FIG. 2 according to this disclosure. One challenge is that for any given WFN there is no mechanism for logically separating and grouping of wireless instruments to meet application needs. Although the system 200 allows the use of multiple logical subnets, each subnet may require its own set of infrastructure nodes, which does not address the problem of underutilized infrastructure or deploying unnecessary collocated infrastructure nodes.

For example, as shown in FIG. 4, each field device network 220a-220b includes one or more field devices 204. The separate field device networks 220a-220b are subnets that can be used by different applications or processing units in order to associate the WFN controllers 203a-203b with different field device communities, to limit the scope of loss in the event of a failure, and to allow selective shutdown of field devices 204 for maintenance and turnarounds.

In the system 200, the wireless infrastructure nodes 202 may have been deployed to achieve a substantially unified backhaul and WiFi access across a plant site. Accordingly, the field device networks 220a-220b may not have caused one or more of the installed wireless infrastructure nodes 202 to reach capacity. That is, one or more wireless infrastructure nodes 202 may have excess capacity that is currently unused.

It may be desirable to use excess capacity on existing infrastructure nodes to support multiple field device networks. For example, it may be desirable to move the field device network 220b to one of the wireless infrastructure nodes 202 in the INODE network 210a. However, one or more of the wireless infrastructure nodes 202 may have to be re-keyed or re-programmed, which may interfere with the deployment scheme of the field device network 220a. Thus, even though excess capacity is available on some wireless infrastructure nodes 202, it may not be possible to utilize this excess capacity under the existing deployment scheme to allow the field device network 220b to join, as indicated in FIG. 4 by the circle with the diagonal line through it. This scenario also effectively limits overall system capacity and results in unused or wasted excess capacity.

Figure 5:
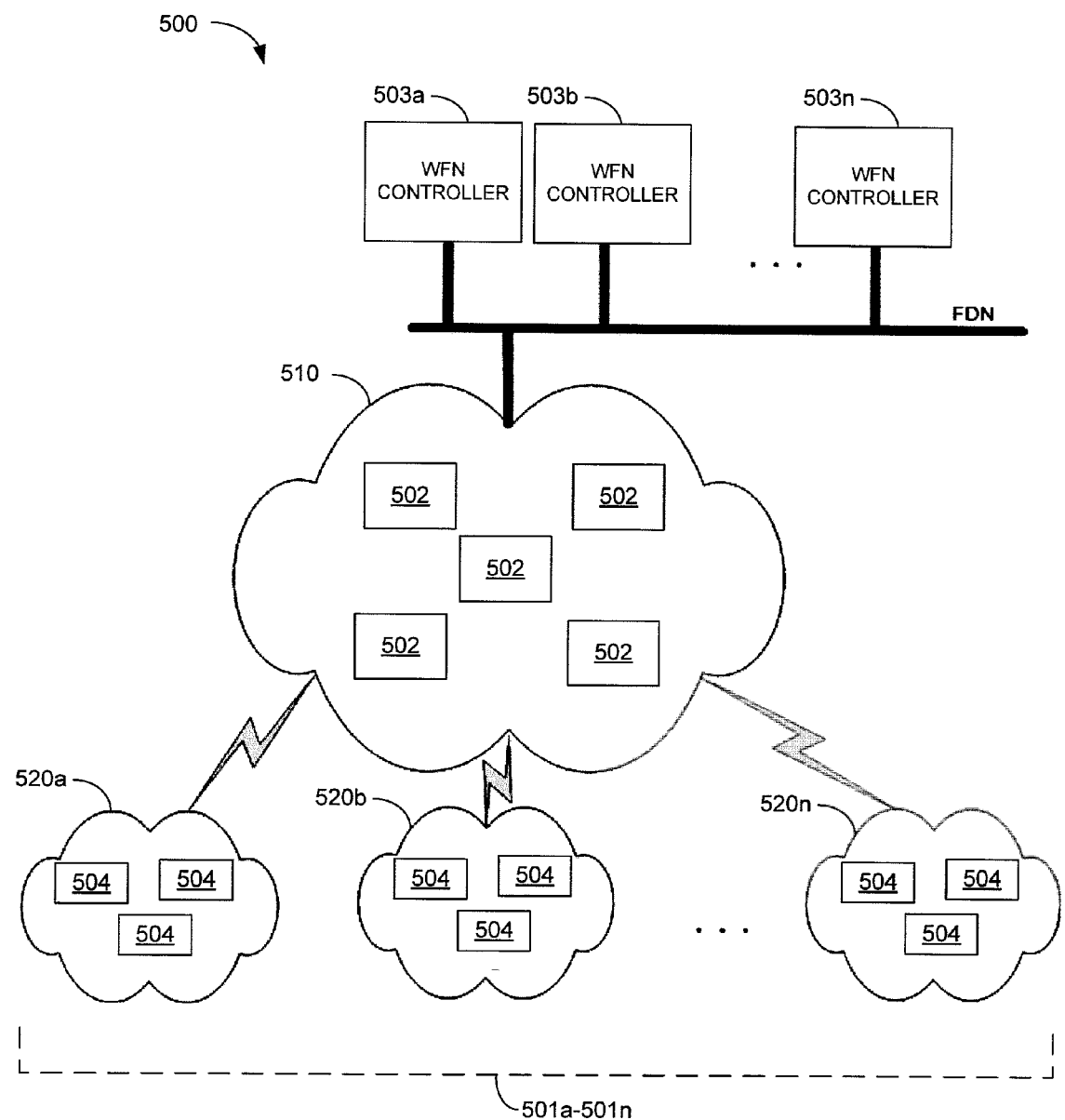
FIG. 5 illustrates an example system having a scalable deployment of logical WFNs according to this disclosure.

FIG. 5 illustrates an example system 500 having a scalable deployment of logical WFNs according to this disclosure. One or more of the components of the system 500 may represent (or be represented by) one or more of the components of the industrial control and automation system 100 shown in FIG. 1. The system 500 solves the problem of deploying multiple collocated WFNs by enabling a group of wireless infrastructure nodes to support multiple logical WFNs.

Similar to the system 200, the system 500 includes a plurality of wireless infrastructure nodes 502, a plurality of WFN controllers 503a-503n, and a plurality of field devices 504. The plurality of wireless infrastructure nodes 502 are arranged in a single INODE network 510. The INODE network 510 represents a pool of shared infrastructure nodes 502 that can be distributed over a large geographical area, such as a physical plant. Each WFN controller 503a-503n may be a single physical entity, a single physical entity with multiple subnetworks, or one or more virtualized entities. The field devices 504 are grouped into a plurality of field device networks 520a-520n. One or more of the field devices 504 may include a wireless sensor for sensing one or more environmental parameters (such as temperature, pressure, vibration, and the like) or a wireless actuator.

In the system 500, multiple logical WFNs 501a-501n are defined. Each of the logical WFNs 501a-501n is associated with a WFN controller 503a-503n and a field device network 520a-520n. All of the logical WFNs 501a-501n share the pooled infrastructure nodes 502 in the INODE network 510. Thus, the INODE network 510 is common to all of the logical WFNs 501a-501n. This is in contrast to the system 200, where each WFN 201a-201n has its own INODE network 210a-210n.

Some existing industry specifications (such as ISA100.11a) support subnets that allow multiple WFNs to coexist and be controlled by the same or multiple WFN controllers. However, infrastructure utilization is still limited under these specifications due to the need to physically segregate the associated infrastructure nodes. In contrast, in the system 500, each wireless infrastructure node 502 is configured to communicate with any WFN controller 503a-503n or field device network 520a-520n in its coverage area. That is, the wireless infrastructure nodes 502 do not associate indefinitely with any particular WFN controller 503a-503n or field device network 520a-520n. Thus, the wireless infrastructure nodes 502 can route upstream and downstream communication between different pairs of WFN controller 503a-503n and field device network 520a-520n.

Each logical WFN 501a-501n is associated with an identifier, such as a wireless field network identifier (WFNID). Within each logical WFN 501a-501n, each field device 504 can be uniquely identified by a field device name or identifier, sometimes referred to as a device tag. The WFNID and device tag values can be assigned by a user (such as a system engineer) or automatically generated and assigned by the system 500. In some embodiments, a supervisory WFN controller or other network controller can be employed to manage the multiple logical WFNs 501a-501n or assign identifiers.

The wireless infrastructure nodes 502 transparently route data packets from a field device network 520a-520n to the intended WFN controller 503a-503n, and vice versa, based on one or more packet identifiers associated with each data packet. The packet identifiers may include or identify information such as source, destination, address, network identification, WFNID, and the like. Each wireless infrastructure node 502 in the NODE network 510 may possess one or more security keys for each logical WFN 201a-201n or a master key that is associated with multiple logical WFNs 201a-201n. Other suitable network identity or security schemes can be used to provide adequate security.

Time synchronization among the components of the system 500 allows a time synchronization scheme, such as time division multiple access (TDMA), to be used across the multiple logical WFNs 501a-501n. Such a time synchronization scheme helps to ensure that all data communication through the NODE network 510 is routed efficiently and accurately with minimal delay or lost packets.

In some embodiments, certain field devices 504 (such as a critical temperature sensor) may provide or receive higher priority data or information than other field devices 504. In such cases, data flow within the NODE network 510 can be prioritized based on data origin, destination, or type of information to ensure quality of service.

Because the pool of wireless infrastructure nodes 502 in the NODE network 510 is shared, the system 500 includes a number of advantages over other systems. For example, the wireless infrastructure nodes 502 can route data packets between any WFN controller 503a-503n and any field device networks 520a-520n, assuming the packet route is within the coverage area of the wireless infrastructure nodes 502. This represents an improvement over other systems in which the wireless infrastructure nodes 502 are associated with only one WFN.

Moreover, because the pool of wireless infrastructure nodes 502 in the NODE network 510 is geographically dispersed and shared among the logical WFNs 501a-501n, there is no geographical limitation on the field devices 504 or the field device networks 520a-520n (other than the overall coverage area of the NODE network 510). Thus, the field device networks 520a-520n can represent a logical grouping of devices, rather than a geographical grouping. The actual device locations of the field devices in a logical WFN 501a-501n can be anywhere within the coverage area of the MODE network 510 (such as anywhere within an industrial plant).

In addition, because the pool of wireless infrastructure nodes 502 in the NODE network 510 is shared, there is no per-WFN capacity limitation due to the capacity of the wireless infrastructure nodes 502. That is, the overall capacity of all of the to wireless infrastructure nodes 502 (not just a portion of the wireless infrastructure nodes 502) in the NODE network 510 can be utilized before there is a need to increase capacity. When capacity is reached, the overall capacity can be increased by adding one or more wireless infrastructure nodes 502 to the NODE network 510. Each newly added wireless infrastructure node 502 will be able to communicate data packets in any of the logical WFNs 501a-501n, as long as the communication route is within the coverage area of the newly added wireless infrastructure node 502. This flexible method for utilizing and increasing system capacity results in better overall utilization, reduced engineering costs, and reduced deployment and maintenance costs.

The grouping and sharing of the wireless infrastructure nodes 502 in the NODE network 510 provide flexibility to add new devices without concern for reaching a system-imposed limit on the number of supported devices, such as may be experienced using smaller, unshared NODE networks. This is new for industrial wireless field device network applications.

Although FIG. 5 illustrates one example of a system 500 for scalable deployment of WFNs, various changes may be made to FIG. 5. For example, the number and types of components shown in FIG. 5 could be greater or fewer depending on implementation. Also, various components in FIG. 5 could be combined, subdivided, or omitted and additional components could be added according to particular needs.

Figure 6:
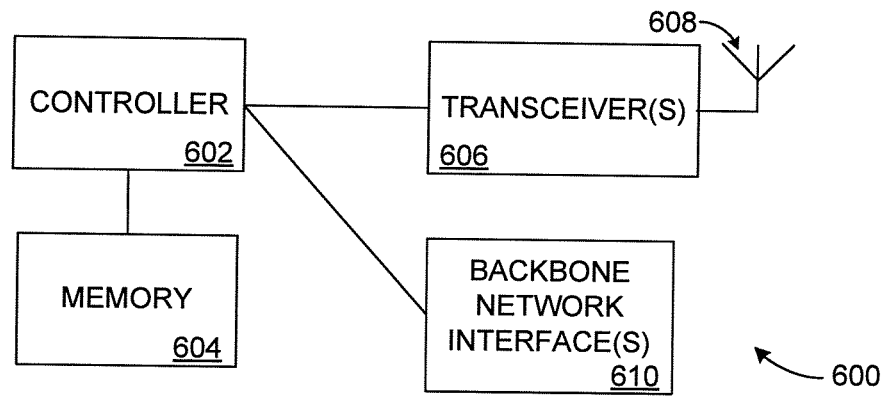
FIG. 6 illustrates an example wireless device in an industrial control and automation system according to this disclosure.

FIG. 6 illustrates an example wireless device 600 in an industrial control and automation system according to this disclosure. The wireless device 600 could, for example, represent one of the components shown in FIG. 1 or FIG. 5. As shown in FIG. 6, the device 600 includes a controller 602, which controls the overall operation of the device 600. For example, the controller 602 may receive or generate data to be transmitted, and the controller 602 could provide the data to other component(s) in the device 600 for transmission over a wired or wireless network. The controller 602 could also receive data over a wired or wireless network and use or forward the data. As a particular example, the controller 602 in a router could receive data transmitted wirelessly, determine a next hop for the data (if any), and provide the data for transmission to the next hop (if any). As another example, the controller 602 in an infrastructure node could perform operations to convert data from one format to another. The controller 602 includes any suitable structure for controlling operation of a device. As particular examples, the controller 602 could represent a processor, microprocessor, microcontroller, field programmable gate array, digital signal processor, or other processing or control device.

A memory 604 is coupled to the controller 602. The memory 604 stores any of a wide variety of information used, collected, or generated by the device 600. For example, the memory 604 could store information received over a network that is to be transmitted over the same or other network. The memory 604 includes any suitable volatile and/or non-volatile storage and retrieval device(s).

The device 600 can include additional components depending on the type and operation of the device 600. For example, in a network router, the device 600 could include at least one wireless transceiver 606 and at least one antenna 608. The transceiver(s) 606 and antenna(s) 608 can be used to communicate wirelessly with one or more sensor nodes, actuator nodes, or other routers. A transceiver 606 could have its own antenna(s) 608, or a collection of transceivers 606 could share one or more antennas 608. Each transceiver 606 includes any suitable structure for providing signals for wireless transmission and/or for obtaining signals received wirelessly. Each antenna 608 represents any suitable structure for transmitting and/or receiving wireless signals. In some embodiments, each transceiver 606 represents an RF transceiver, and each antenna 608 represents an RF antenna. Note that any other suitable wireless signals could be used to communicate and that each transceiver could include a transmitter and a separate receiver. If multiple antennas 608 are used, spatial diversity or other types of diversity can be used to improve communication reliability.

If the device 600 represents an infrastructure node, the device 600 can further include one or more backbone network interfaces 610. The backbone network interfaces 610 allow the device 600 to communicate over one or more backbone networks 114 or other networks. Each backbone network interface 610 includes any suitable structure for transmitting and/or receiving signals over a backbone network, such as an Ethernet interface or a wireless transceiver.

Although FIG. 6 illustrates one example of a wireless device 600 in an industrial control and automation system, various changes may be made to FIG. 6. For example, various components in FIG. 6 could be combined, subdivided, or omitted and additional components could be added according to particular needs. Also, a "wireless device" or "wireless router" represents any device or router that can transmit and/or receive data wirelessly, even if the device or router has the ability to transmit and/or receive data over a wired connection as well.

Figure 7:
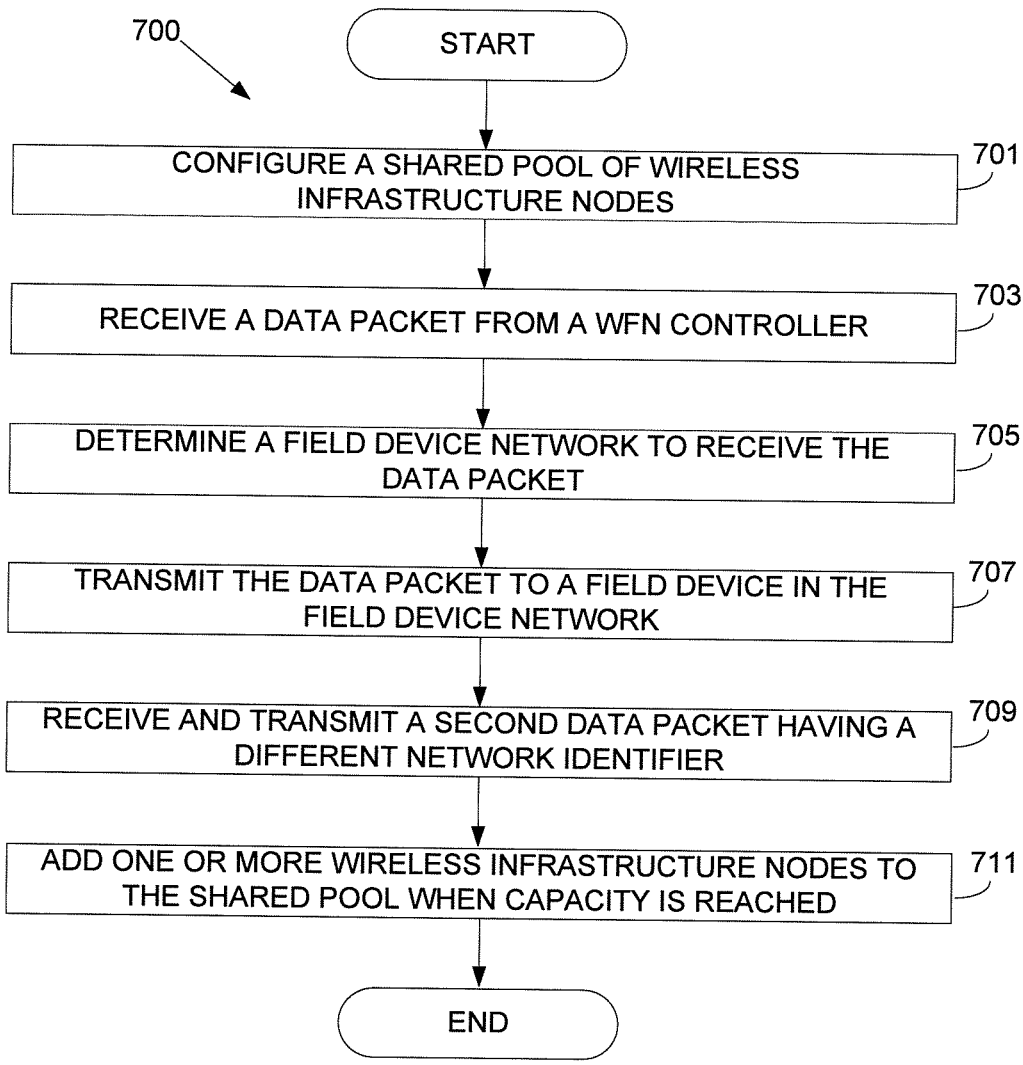
FIG. 7 illustrates an example method for communicating using a scalable deployment of logical WFNs according to this disclosure.

FIG. 7 illustrates an example method 700 for communicating using a scalable deployment of logical WFNs according to this disclosure. For ease of explanation, the method 700 is described as being performed by the system 500 of FIG. 5. However, the method 700 could be used with any suitable device or system.

At step 701, multiple wireless infrastructure nodes are arranged and configured in a pool to be shared among a plurality of logical WFNs. The logical WFNs include the shared pool of wireless infrastructure nodes, WFN controllers, and field device networks, where each field device network has one or more field devices. This may include, for example, configuring a system like the system 500 in FIG. 5.

At step 703, a wireless infrastructure node receives a data packet from a WFN controller. This may include, for example, one of the wireless infrastructure nodes 502 receiving a data packet from the WFN controller 503a. The data packet includes a network identifier, such as a WFNID. The data packet may also include a device identifier, such as a device tag.

At step 705, the wireless infrastructure node uses the network identifier to determine a field device network to receive the data packet. This may include, for example, the wireless infrastructure node 502 determining that the data packet is intended for the field device network 520a based on the WFNID. In some embodiments, the wireless infrastructure node 502 also uses the device tag to determine a particular field device 504 among the field devices in the field device network 520a.

At step 707, the wireless infrastructure node transmits the data packet to the field device in the field device network. This may include, for example, the wireless infrastructure node 502 transmitting the data packet to a particular field device 504 in the field device network 520a. In some embodiments, the wireless infrastructure node receives and transmits the data packet according to a time synchronization scheme (such as TDMA) that is commonly used by the pooled infrastructure nodes.

At step 709, the wireless infrastructure node receives a second data packet from a second WFN controller and transmits the second data packet to a field device in a second field device network. This may include, for example, the wireless infrastructure node 502 receiving a second data packet from the WFN controller 503b and transmitting the second data packet to a field device 504 in the field device network 520b. The second to data packet includes a network identifier that is different from network identifier included with the first data packet. In some embodiments, the receiving and transmitting of the first data packet is prioritized over the receiving and transmitting of the second data packet based on a higher priority level of the first data packet over the second data packet.

At step 711, when the data packet traffic through the pool of shared wireless infrastructure nodes approaches or exceeds the overall capacity of the pool of shared wireless infrastructure nodes, one or more additional wireless infrastructure nodes are added to the shared pool. This may include, for example, adding one or more wireless infrastructure nodes 502 to the INODE network 510. The additional wireless infrastructure node(s) are configured to communicate with any of the WFN controllers and any of the field device networks in any of the logical WFNs.

Although FIG. 7 illustrates one example of a method 700 for communicating using a scalable deployment of logical WFNs, various changes may be made to FIG. 7. For example, while shown as a series of steps, various steps shown in FIG. 7 could overlap, occur in parallel, occur in a different order, or occur multiple times. Moreover, some steps could be combined or removed and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A wireless infrastructure node comprising:
at least one processing device configured to:
receive a first data packet from a first wireless field device network (WFN) controller, the first data packet comprising a network identifier;
determine a first field device network to receive the first data packet based on the network identifier;
transmit the first data packet to a first field device in the first field device network;

receive a second data packet from a second WFN controller;

transmit the second data packet to a second field device in a second field device network; and prioritize the first data packet over the second data packet based on a higher priority level of the first data packet over the second data packet;

wherein the wireless infrastructure node, the first WFN controller, and the first field device network comprise a first logical WFN among a plurality of logical WFNs;

wherein the wireless infrastructure node, the second WFN controller, and the second field device network comprise a second logical WFN among the plurality of logical WFNs; and wherein the wireless infrastructure node is one of a plurality of pooled infrastructure nodes configured to communicate between a plurality of WFN controllers and a plurality of field device networks arranged in the plurality of logical WFNs.

2. The wireless infrastructure node of claim 1, wherein the first and second WFN controllers, the wireless infrastructure node, and the first and second field devices comprise components in an industrial control and automation system.

3. The wireless infrastructure node of claim 1, wherein each of the first and second data packets comprises a device tag identifying the corresponding field device among a plurality of field devices in the corresponding field device network.

4. The wireless infrastructure node of claim 1, wherein the at least one processing device is configured to receive and transmit the first and second data packets according to a time synchronization scheme that is commonly used by the pooled infrastructure nodes.

5. The wireless infrastructure node of claim 4, wherein the time synchronization scheme comprises time division multiple access (TDMA).

6. The wireless infrastructure node of claim 1, wherein each of the first and second field devices comprises at least one of: a sensor and an actuator.

7. A method comprising:

receiving, at a wireless infrastructure node, a first data packet from a first wireless field device network (WFN) controller, the first data packet comprising a network identifier;

determining, at the wireless infrastructure node, a first field device network to receive the first data packet based on the network identifier;

transmitting, by the wireless infrastructure node, the first data packet to a first field device in the first field device network;

receiving, at the wireless infrastructure node, a second data packet from a second WFN controller;

transmitting, by the wireless infrastructure node, the second data packet to a second field device in a second field device network; and prioritizing, by the wireless infrastructure node, the first data packet over the second data packet based on a higher priority level of the first data packet over the second data packet;

wherein the wireless infrastructure node, the first WFN controller, and the first field device network comprise a first logical WFN among a plurality of logical WFNs;

wherein the wireless infrastructure node, the second WFN controller, and the second field device network comprise a second logical WFN among the plurality of logical WFNs; and wherein the wireless infrastructure node is one of a plurality of pooled infrastructure nodes configured to communicate between a plurality of WFN controllers and a plurality of field device networks arranged in the plurality of logical WFNs.

8. The method of claim 7, wherein the first and second WFN controllers, the wireless infrastructure node, and the first and second field devices comprise components in an industrial control and automation system.

9. The method of claim 7, wherein each of the first and second data packets comprises a device tag identifying the corresponding field device among a plurality of field devices in the corresponding field device network.

10. The method of claim 7, wherein the wireless infrastructure node receives and transmits the first and second data packets according to a time synchronization scheme that is commonly used by the pooled infrastructure nodes.

11. The method of claim 10, wherein the time synchronization scheme comprises time division multiple access (TDMA).

12. The method of claim 7, wherein each of the first and second field devices comprises at least one of: a sensor and an actuator.

13. A system comprising:

a plurality of wireless field device network (WFN) controllers;

a plurality of field device networks, each field device network comprising one or more field devices; and a plurality of wireless infrastructure nodes arranged in a shared pool, the pooled infrastructure nodes configured to communicate between the plurality of WFN controllers and the plurality of field device networks, each wireless infrastructure node configured to:

receive a first data packet from a first one of the WFN controllers, the first data packet comprising a network identifier;

determine a first one of the field device networks to receive the first data packet based on the network identifier;

transmit the first data packet to a first field device in the first field device network;

receive a second data packet from a second one of the WFN controllers;

transmit the second data packet to a second field device in a second one of the field device networks; and prioritize the first data packet over the second data packet based on a higher priority level of the first data packet over the second data packet;

wherein the WFN controllers, the field device networks, and the wireless infrastructure nodes are arranged in a plurality of logical WFNs, each logical WFN comprising at least one of the WFN controllers, at least one of the field device networks, and the pooled infrastructure nodes.

14. The system of claim 13, wherein the WFN controllers, the wireless infrastructure nodes, and the field devices comprise components in an industrial control and automation system.

15. The system of claim 13, wherein each of the first and second data packets comprises a device tag identifying the corresponding field device among the one or more field devices in the corresponding field device network.

16. The system of claim 13, wherein each wireless infrastructure node is configured to receive and transmit the first and second data packets according to a time synchronization scheme that is commonly used by the pooled infrastructure nodes.

17. The system of claim 16, wherein the time synchronization scheme comprises time division multiple access (TDMA).

18. The system of claim 13, wherein each of the first and second field devices comprises at least one of: a sensor and an actuator.

19. The system of claim 13, wherein the system is configured, when a level of data packet traffic through the shared pool of wireless infrastructure nodes approaches or exceeds an overall capacity of the shared pool of wireless infrastructure nodes, to be expanded by one or more additional wireless infrastructure nodes in the shared pool.

20. The system of claim 19, wherein each of the one or more additional wireless infrastructure nodes is configured to communicate with any of the WFN controllers and field device networks within a coverage area of the each additional wireless infrastructure node.

* * * * *